No. 682,286. Patented Sept. 10, 1901.
F. B. SHAFER.
VAPOR GENERATOR AND BURNER.
(Application filed July 30, 1900.)
(No Model.)
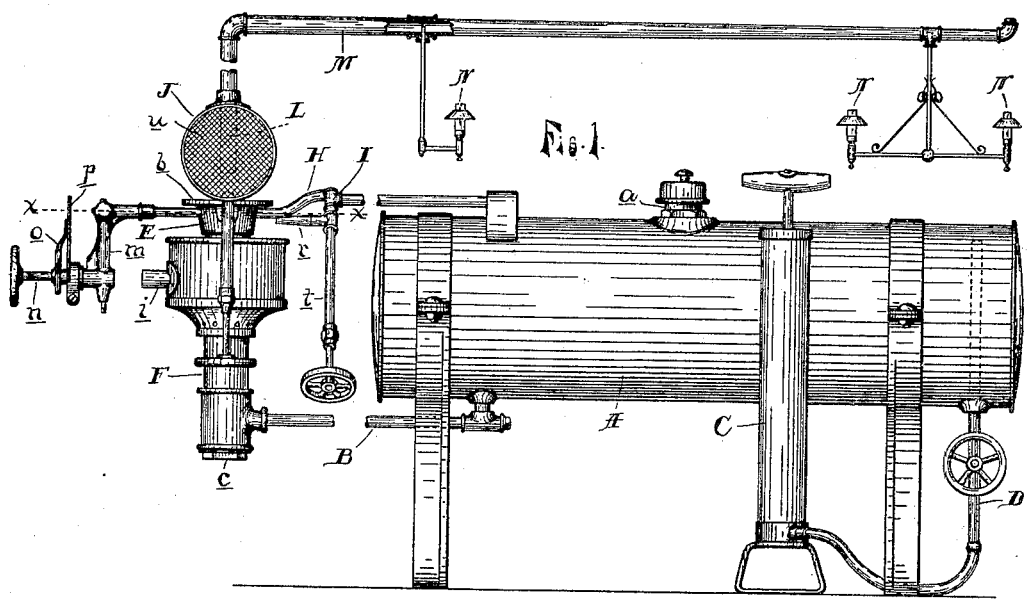
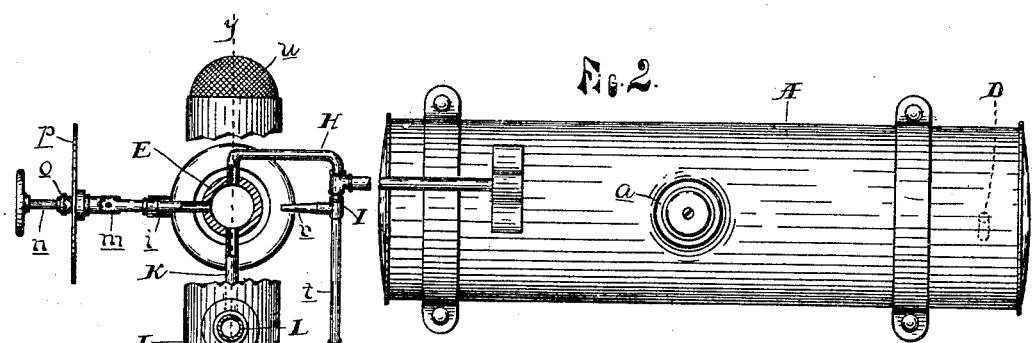
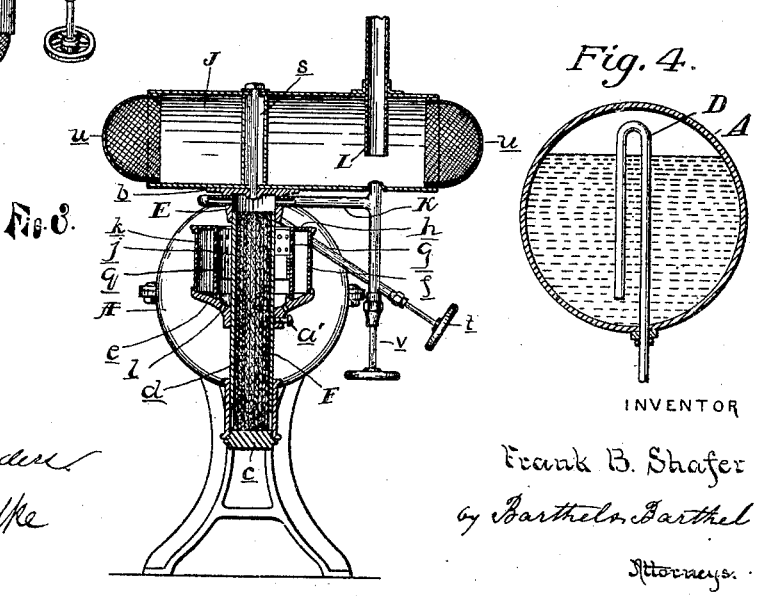
WITNESSES:
Lewis E. Flanders
Joseph A. Noelke
INVENTOR
Frank B. Shafer
by Barthel & Barthel
Attorneys.

UNITED STATES PATENT OFFICE.

FRANK B. SHAFER, OF HOWELL, MICHIGAN, ASSIGNOR TO ADONIRAM JUDSON PRINDLE, EDWARD A. BOWMAN, AND BENJAMIN R. LANE, OF SAME PLACE, NELSON J. McCOLOUGH, OF ITHACA, AND VIRGIL L. STARK, OF BYRON, MICHIGAN.

VAPOR GENERATOR AND BURNER.

SPECIFICATION forming part of Letters Patent No. 682,286, dated September 10, 1901.

Application filed July 30, 1900. Serial No. 25,237. (No model.)

*To all whom it may concern:*

Be it known that I, FRANK B. SHAFER, a citizen of the United States of America, residing at Howell, in the county of Livingston and State of Michigan, have invented certain new and useful Improvements in Vapor Generators and Burners, of which the following is a specification, reference being had therein to the accompanying drawings.

This invention relates to that class of hydrocarbon generators and burners, in which a single generator is employed to supply a number of incandescent vapor-lamps located at some distance from the generator with a suitable mixture of vapor and air under tension; and the object of the invention is to make a generator of the kind adapted to commercial uses for lighting stores, halls, churches, and other places in which generally a number of lights are maintained, thus doing away with the necessity of looking after each lamp individually.

My invention embodies simple means for regulating the quantity of gas according to the number of lights maintained and embraces certain features of construction whereby it is simple, cheap, and perfect in its operation, all as more fully hereinafter described, and shown in the accompanying drawings, in which—

Figure 1 is an elevation of my improved gas-generator. Fig. 2 is a plan, partly in horizontal section, on line $x\,x$, Fig. 1. Fig. 3 is a vertical section on line $y\,y$, Fig. 2; and Fig. 4 is a cross-section through the tank.

A is a hermetically-closed tank for holding a supply of gasolene and provided with a suitable capped fill-opening $a$ on top and a supply-pipe B, leading from the bottom thereof to the generating devices.

C is an air-pump, and D is a valve-controlled inlet-pipe into the bottom of the tank to which said air-pump is connected for the purpose of producing a pressure of air in the tank, the air being forced through the gasolene by having the outlet of the pipe D submerged in the gasolene.

E is a retort or vapor-chamber of conical outer shape and having a flange $b$ around its top. Into the bottom of this retort is screwed a hollow stem F, which constitutes the oil or liquid supply chamber and communicates at the bottom with the supply-pipe B from the bottom of the supply-tank. The stem F is closed at its lower end by a removable screw-plug $c$, and its interior is filled with a plug $d$ of absorbent material. Upon the stem F is secured a gallery $e$, which supports two concentric shells $f\,g$, forming two annular chambers $k$ and $j$, the outer one of which is closed on top by a centrally-apertured plate $h$, while the inner one is open on top and communicates through perforations in the shell $g$ with the chamber $k$ and through perforations $l$ in the gallery with the atmosphere for the admission of air into the chamber $j$.

The parts just described form a vapor-burner to which the vapor is supplied from the retort or vapor-chamber through a pipe $m$, terminating in a suitable jet-orifice controlled by a needle-valve $n$ and placed opposite an open mixing-tube $i$, leading into the chamber $k$ near the bottom, all so arranged that the vapor from the retort is discharged under control of the valve $n$ into the tube $i$, where it is mixed with air and passes into the chamber $k$, in which it is reheated and flows through the perforations in the shell $g$ into the inner chamber $j$, from which it issues through the open top and when lighted forms a flame for heating the retort and the upper portion of the stem F, into which the oil is supplied from the tank. The needle-valve $n$ carries an index-arm $o$, which passes over an index-plate $p$ to show the degree of opening of the valve for the purpose of regulating the flame. The shell $g$ is not perforated its whole height, but has an imperforate base portion, and the perforated area can be regulated by means of an imperforate band $q$, which can be slipped up or down on the shell. This band may be held in any position on the inside, as shown, merely by friction, and to facilitate its adjustment the vapor-burner is secured upon the stem F by a set-screw $a'$, so that by loosening this the burner can be lowered enough to make the band accessible through the opening in the top of the plate *h*. The retort or vapor-chamber E, which is slightly above the top of the tank, communicates through the equalizing-pipe H (which is also above the tank) with the interior of the tank at the top, and this pipe has a branch I, which terminates in a burner-tip *r*, opposite the wall of the retort in heating proximity thereto, the passage of vapor to the tip *r* being controlled by a needle-valve *t* in the branch I.

J is an air-heating chamber secured upon the top of the retort by the bolt *s*. This chamber, which is preferably made in the form of a sheet-metal cylinder, is secured in horizontal position upon the retort and has its opposite ends closed by fine-meshed screen-caps *u*, removably secured in the open ends. Into the bottom of this chamber (where it overhangs the burner) leads the vapor-discharge pipe K from the retort or vapor-chamber. This pipe terminates in an upwardly-pointing jet-orifice within the heating-chamber, and the passage through it to the jet-orifice is controlled by a needle-valve *v*. Above the jet-orifice a mixing-tube L is secured and leads out through the top of the heating-chamber, and this mixing-tube connects directly with the distributing-pipe M, which conducts the combustible vapor to the lamps N, which are of the known character of incandescent vapor-burners.

The manner in which the apparatus is adapted to operate is as follows: After filling the tank with gasolene compressed air is forced into the tank by means of the air-pump. Then the valve *t* is opened, thus permitting carbureted air from the top of the tank to escape therefrom through the nipple *r*. This being lighted, the flame envelops the retort or vapor-chamber and the portion of the stem immediately connected thereto, and after they become hot the generation of vapor within the retort is started. When this generation takes place, (which the operator may readily ascertain to be the case when the pipe H begins to feel hot near the retort,) the valve *n* is opened and the valve *t* is closed. The vapor from the retort is thus admitted to the burner below the retort, and with the lighting of this an increased generation will take place beyond the capacity of the burner to consume itself and the surplus will be conducted to the lamps by opening the valve *v*. As the vapor is under considerable tension, the jet issuing from the discharge-pipe K into the mixing-tube L will force the mixture of vapor and air through the service-pipe and maintain the lamps at a considerable distance from the generator, which latter may therefore be placed into the cellar or other out-of-the-way place, while the tank A may be located at any distance from the generator, avoiding all danger of its heating by proximity to the burner.

There is no danger from generating too great a pressure of vapor, as the absorbent plug *d* prevents the liquid from feeding fast enough, and then the liquid can only rise to near the top of the stem F, as the equalizing-pipe H equalizes the pressure in the retort and its connection with the tank under all conditions of its operation.

The use of this system of lighting in stores or other places where a fixed number of lights is usually maintained thus does away with the danger incidental to the use of the ordinary incandescent vapor-lamps, in which each lamp is supplied from a reservoir on the lamp itself, and it also has other advantages, as it is obviously cheaper and requires less care to supply all the lamps from one generator.

By the proper adjustment of the needle-valve *n* the apparatus can be regulated to support any given number of lamps within a certain limit. The amount of air to be mixed with the vapor will automatically regulate itself, as with any increase or decrease of the tension of the vapor the jet will proportionately vary the amount of air which it will induce into the mixing-tube.

The imperforate band *q*, it will be seen, acts to a certain extent as a screen to protect the stem F from the flame of the burner—that is, in raising it the portion of the tube F against which the flame acts will be reduced and less vapor will be generated and by lowering it the converse will take place. If the number of lights is therefore materially reduced or increased, this band should be correspondingly raised or lowered.

The walls of the chamber *j* being exposed to the heat of the burner will heat the air before it is admitted into the tube L. There is therefore no danger of any condensation taking place in this chamber, (nor in the pipe M,) and while the screens *u* do not exclude the air they prevent the vapor from being accidentally lighted within the chamber.

The apparatus is very simple in its construction, and as the valves *n*, *t*, and *v* are all placed in convenient positions it is quite easily managed.

What I claim as my invention is—

1. In a gas-vapor generator, the combination of the liquid-hydrocarbon-supply tank, provided with means for supplying it with air under pressure, the vapor-generator, comprising a retort in constant communication with the air-space of the supply-tank, and a vertical tubular stem filled with an absorbent material and in constant communication with the liquid in the tank, a burner upon the stem below the retort formed with a closed outer vapor-heating chamber into which vapor derived from the retort and mixed with air is admitted under control of a valve, and with an inner combustion-chamber having air-admission ports in its bottom and communicating with the outer chamber through a perforated partition having means for restricting the number of its openings, a valve-controlled pipe leading from the air-space of the tank and terminating in a burner-tip opposite the side of the retort in heating relation thereto, an air-heating chamber mounted upon the retort and provided with screened air-admission openings, a valve-controlled vapor-discharge pipe from the retort into the bottom of said air-heating chamber and terminating in an upwardly-directed jet-orifice, an air-mixing tube vertically opposite the jet-orifice, and a distribution-pipe rising from said mixing-tube to a series of distant incandescent vapor-burners.

2. In a system of incandescent lighting by means of hydrocarbon vapor, the combination with a series of incandescent hydrocarbon-burners and a service-pipe for supplying the same with vapor from a common source, of a hydrocarbon-vapor generator at the receiving end of the service-pipe formed with a retort on top and a depending oil-tube filled with an absorbent material, a generator-burner upon said oil-tube below the retort, two independent vapor-discharge pipes from the retort each terminating in a valve-controlled jet-nozzle, one adapted to supply the generator-burner and the other adapted to supply the service-pipe with vapor for the incandescent burners, an oil-supply tank on a level with the generator, a pipe connecting the bottom of the tank with the oil-tube of the generator, a pipe connecting the top of the tank above the level of the oil with the retort, means for supplying the space of the tank above the oil with carbureted air under pressure and an independent jet-burner communicating with said space and directing its flame horizontally against the generator above the generator-burner.

3. In a system of incandescent lighting by means of hydrocarbon vapor, the combination with a series of incandescent hydrocarbon-burners and a service-pipe for supplying the same with vapor from a common source and having its receiving end formed by an open-ended riser-pipe, of a hydrocarbon-vapor generator below the riser-pipe comprising an oil-tube filled with an absorbent material, a generator-burner upon the oil-tube and a retort on top of the oil-tube, a vapor-discharge pipe from the retort terminating in an upwardly-directed jet-nozzle below the open end of the riser-pipe, a second vapor-discharge pipe from the retort for supplying the generator-burner, an oil-supply tank on a level with the generator, means for supplying the space in the tank above the oil with a supply of carbureted air under pressure, an oil-supply pipe connecting the bottom of the tank with the oil-tube of the generator, an equalizing-pipe connecting the retort of the generator with the space in the tank above the oil and a jet-burner communicating directly with said equalizing-pipe, said jet-burner above the generator-burner and adapted to initially heat the upper portion of the generator.

In testimony whereof I affix my signature in presence of two witnesses.

FRANK B. SHAFER.

Witnesses:
OTTO F. BARTHEL,
JOSEPH A. NOELKE.